(12) United States Patent
Yang

(10) Patent No.: US 6,445,856 B1
(45) Date of Patent: Sep. 3, 2002

(54) OPTICAL BEAM MONITORING DEVICE

(75) Inventor: Long Yang, Union City, CA (US)

(73) Assignee: JDS Uniphase Corp., San Jose, CA (US)

( * ) Notice: Subject to any disclaimer, the term of this patent is extended or adjusted under 35 U.S.C. 154(b) by 0 days.

(21) Appl. No.: 09/871,676

(22) Filed: Jun. 4, 2001

(51) Int. Cl.[7] .............................. G02B 6/26; G01J 1/00; G01J 4/00
(52) U.S. Cl. .............................. 385/48; 385/44; 385/47; 385/51; 356/369; 356/213; 356/218
(58) Field of Search .............................. 356/369, 364, 356/367, 213, 218, 219, 221; 385/27, 48, 44, 47, 51

(56) References Cited

U.S. PATENT DOCUMENTS

| 4,310,217 A | * | 1/1982 | de Mendez et al. | .... 250/227.24 |
| H474 H | * | 6/1988 | Taylor | .......................... 385/27 |
| 4,848,999 A | * | 7/1989 | Taylor | .......................... 65/4.3 |
| 4,995,696 A | * | 2/1991 | Nishimura et al. | .......... 359/333 |
| 5,523,837 A | * | 6/1996 | Prozzo | ........................ 356/218 |
| 6,124,956 A | * | 9/2000 | Severn | ........................ 359/110 |

* cited by examiner

Primary Examiner—Frank G. Font
Assistant Examiner—Roy M. Punnoose
(74) Attorney, Agent, or Firm—Hall, Priddy, Myers & Vande Sande

(57) ABSTRACT

The most common method of testing the various aspects of light traveling in a waveguide includes tapping a portion of the light and directing the tapped portion at an appropriate sensor. Conventionally, the simplest method for tapping light utilized a fused fiber coupler; however, even this method requires additional fiber splicing and management steps that increase manufacturing costs. The present invention uses a beam splitter, positioned inside a centerpiece sleeve in the path of the light, to direct a portion of the beam through the wall of the centerpiece sleeve to a monitoring sensor, preferably a photodiode. The centerpiece sleeve includes a window, which is at least partially transparent to the light, enabling the tapped portion of the light to reach the monitoring sensor. Preferably, the centerpiece sleeve is manufactured entirely out of glass.

14 Claims, 1 Drawing Sheet

OPTICAL BEAM MONITORING DEVICE

TECHNICAL FIELD

The present invention relates to an optical beam monitoring device, and in particular to a device for tapping light from a sealed optical centerpiece for monitoring the light passing therethrough.

BACKGROUND OF THE INVENTION

Monitoring the various parameters of light traveling in an optical waveguide is typically performed using an optical tap, which directs a small portion of the light to an applicable monitor. Conventional optical taps have taken many forms, including those disclosed in U.S. Pat. No. 4,135,780 issued Jan. 23, 1979 in the name of Richard Dyott; U.S. Pat. No. 4,398,795 issued Aug. 16, 1983 in the name of John Palmer; and U.S. Pat. No. 4,475,789 issued Oct. 9, 1984 in the name of David Kahn. The Palmer Patent relates to measuring the amount of light lost from an optical fiber bent over a solid support, while the Kahn Patent relates to monitoring the light radiated away from a fiber splice. The Dyott Patent discloses one example of, perhaps, the most common optical tapping method, which includes fusing a second optical waveguide beside the original waveguide for collecting light therefrom. Unfortunately, the systems disclosed in the aforementioned patents require several invasive and costly steps to implement.

U.S. Pat. No. 4,995,696 issued Feb. 26, 1991 to Eiichi Nishimura et al; and U.S. Pat. No. 5,523,837 issued Jun. 4, 1996 to Christopher Prozzo disclose optical power meters utilizing beam splitters to tap off a portion of the light for monitoring. Both of these devices require the construction of special housings to accommodate the photodiode, which increases material costs. Moreover, to construct the aforementioned devices, the process would include the added step of sealing the photodiode wiring, which passes through the housing. This adds both to material costs and manufacturing costs.

An object of the present invention is to overcome the shortcomings of the prior art by providing an optical beam monitoring device that does not affect the integrity of the system nor require the manufacture of special housings.

SUMMARY OF THE INVENTION

Accordingly, the present invention relates to a light monitoring device comprising:

a first lens for collimating an input light beam;

beam splitter means for separating the input light beam into a tap portion and a through portion, and for directing the tap portion and the through portion in different directions;

second lens for focusing the through portion;

a sleeve enclosing the first lens, the beam splitter means and the second lens, the sleeve including a window, which is at least partially transparent to the tap portion; and monitoring means disposed externally of the sleeve for receiving the tap portion;

whereby the beam splitter means directs the tap portion through the window to the monitoring means.

BRIEF DESCRIPTION OF THE DRAWINGS

The invention will be described further with reference to the accompanying drawings, which represent a preferred embodiment of the invention, wherein.

DETAILED DESCRIPTION OF THE PREFERRED EMBODIMENT

Figure 1:
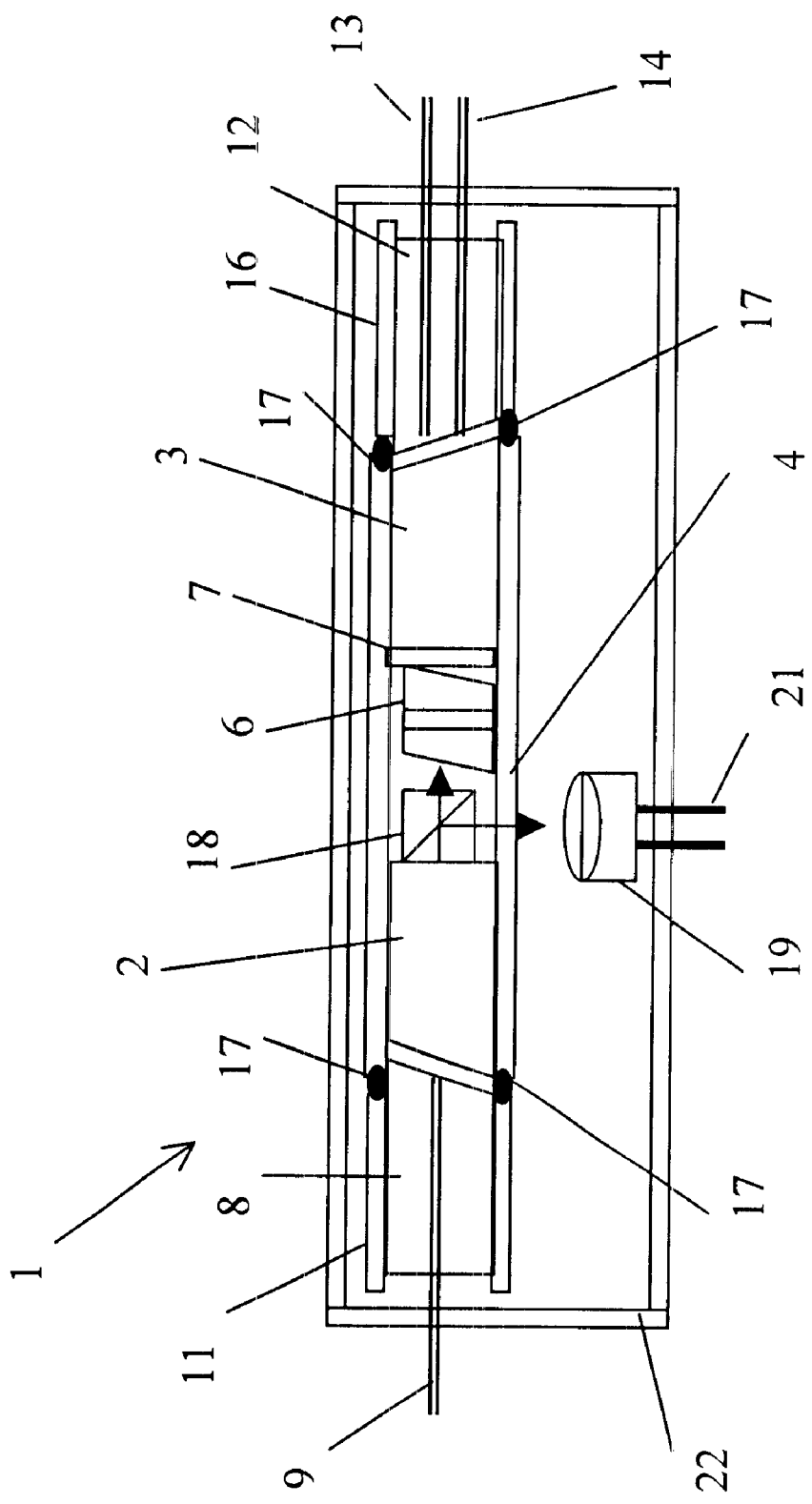
FIG. 1 is a schematic illustration of the optical beam monitoring device according to the present invention.

The optical beam monitoring device of the present invention is integrated into an optical centerpiece assembly 1, which includes a first lens 2 and a second lens 3 sealing opposite ends of a sleeve 4. The first and second lenses 2 and 3 are typically ¼-pitch graded index (GRIN) lenses, which can be used for both collimating or focusing light; however, for the sake of convenience we will describe the case in which light travels from left to right, i.e. collimated in lens 2 and focused by lens 3. Typically, an optical centerpiece also includes one or more optical components, which act on or direct the light as desired. The centerpiece in the embodiment illustrated in FIG. 1 includes an isolator 6 and a WDM thin-film filter 7, for reasons that will be explained later. A first ferrule 8, encasing one end of optical fiber 9, is attached to one end of the centerpiece I using a first mounting collar 11. A second ferrule 12, encasing one end of each of optical fibers 13 and 14, is attached to the other end of the centerpiece 1 using a second mounting collar 16. The first and second mounting collars 11 and 16 are fixed to the sleeve 4 using an appropriate adhesive or solder material 17. In the illustrated embodiment the second ferrule 12 is a dual-fiber ferrule; however, it is conceivable that a single fiber ferrule could be used, if the optical components were different.

During typical use of this centerpiece, light of a certain wavelength launched from optical fiber 9 passes through the isolator 6 and the filter 7 to be combined with light of various other wavelengths input via optical fiber 13, which is reflected by the filter 7. The combined light is output via optical fiber 14. Any light that passes through filter 7 from optical fiber 13 is prevented from entering optical fiber 9 by isolator 6.

According to the present invention a beam splitter 18 is positioned within the centerpiece 1 to direct a small portion, e.g. 1% to 10% of the input light, called the tap portion, through the wall of the sleeve 4 to a monitoring sensor 19, preferably a lensed photodiode. Sensor 19 transmits the required information via electrical wiring 21 to a control and monitoring station (not shown). The remaining portion of the light, called the through portion, proceeds as described above. The entire structure, including the sensor 19, is mounted in a housing 22, which provides a protective shell and a stable platform. Although this device is ideally suited as a power monitoring device, it is also suitable for use in systems for monitoring other characteristics of optical signals, e.g. polarization and wavelength. A polarimeter can be constructed by cascading four of the beam splitters 18 with appropriate half-wave plates and polarizers as is known in the art. Moreover, a polarization-dependent monitor could be provided to determine how much light was in a desired state of polarization. Various WDM monitoring systems could also be performed as well known in the art.

It is only necessary to provide a small partially transparent window in the sleeve for the tap light to exit. However, it is preferable that, the entire sleeve 4 is made of single material, e.g. glass, which is transparent to the tap portion of the light. There are several advantages in making the entire sleeve 4 out of glass, the first being that the cost of manufacturing the sleeve will be greatly reduced when the entire sleeve is made of the same material. The second advantage is the elimination of uneven thermal expansion resulting from manufacturing the sleeve with different materials with differing coefficients of thermal expansion. Furthermore, a sleeve made entirely out of glass may have a thermal expansion coefficient that matches the thermal expansion coefficients of the other elements in centerpiece. Perhaps, most importantly, not having to align a window of the sleeve with the beam splitter 18 and the sensor 19 will greatly reduce assembly time and cost.

The beam splitter 18 can take any form, provided that the tap portion of the beam gets directed through the sleeve 4 to the sensor 19. Preferably, the beam splitter 18 is a cubic beam splitter comprised of two prisms with a partially reflective coating therebetween, which directs the tap portion of the beam perpendicularly to the through portion towards the sensor 19.

We claim:

1. A light monitoring device comprising:

a first lens for collimating an input light beam;

beam splitter means for separating the input light beam into a tap portion and a through portion, and for directing the tap portion and the through portion in different directions;

second lens for focusing the through portion;

a sleeve enclosing the first lens, the beam splitter means and the second lens, said sleeve including a window, which is at least partially transparent to the tap portion; and monitoring means disposed externally of the sleeve for receiving the tap portion;

whereby the beam splitter means directs the tap portion through the window to the monitoring means.

2. The device according to claim 1, wherein the window is glass.

3. The device according to claim 1, wherein the entire sleeve is at least partially transparent to the tap portion.

4. The device according to claim 1, wherein the entire sleeve is manufactured from the same material, which is at least partially transparent to the tap portion.

5. The device according to claim 1, wherein the entire sleeve is glass.

6. The device according to claim 1, further comprising a first waveguide optically coupled to the first lens, and a second waveguide optically coupled to the second lens.

7. The device according to claim 6, wherein the first waveguide is a first optical fiber mounted in a first ferrule, and the second waveguide is a second optical fiber mounted in a second ferrule.

8. The device according to claim 1, wherein the monitoring means is for measuring the power in the input beam.

9. The device according to claim 8, wherein the monitoring means includes a photodiode.

10. The device according to claim 8, wherein the monitoring means includes a lensed photodiode.

11. The device according to claim 1, wherein the beam splitter means is a beam splitting cube including a partially reflective coating positioned therein.

12. The device according to claim 11, wherein the beam splitting cube directs the tap portion substantially perpendicular to the through portion.

13. The device according to claim 1, wherein the monitoring means comprises polarization monitoring means.

14. The device according to claim 13, wherein the polarization monitoring means is a polarimeter.

* * * * *